No. 794,864. PATENTED JULY 18, 1905.
P. J. KAMPERDYK.
ELECTRIC BATTERY.
APPLICATION FILED APR. 2, 1904.
2 SHEETS—SHEET 1.
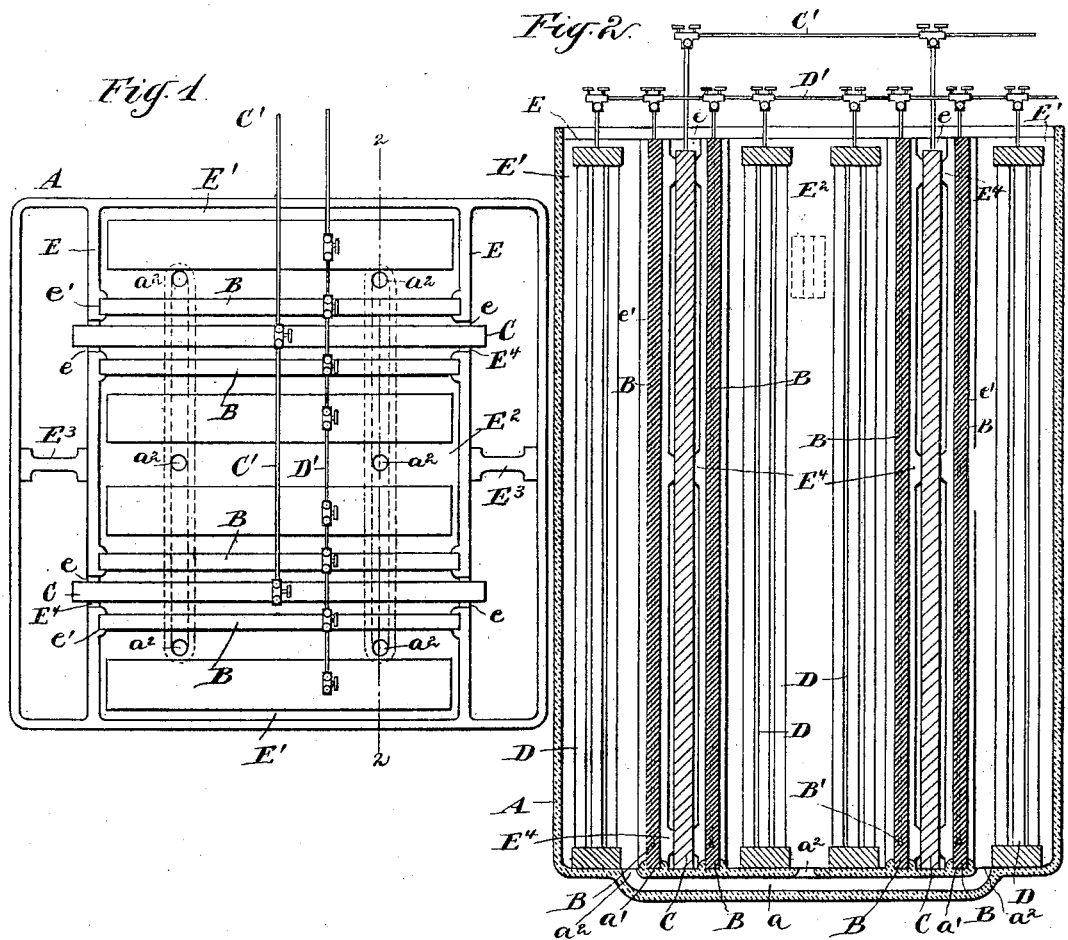
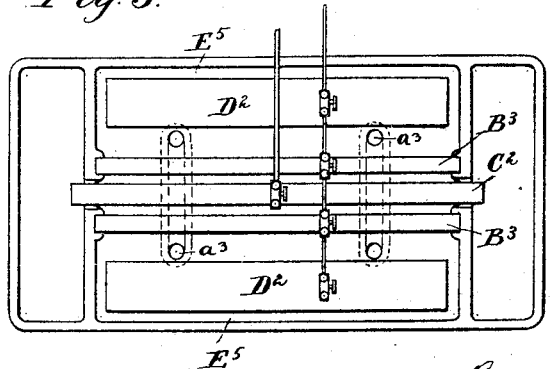

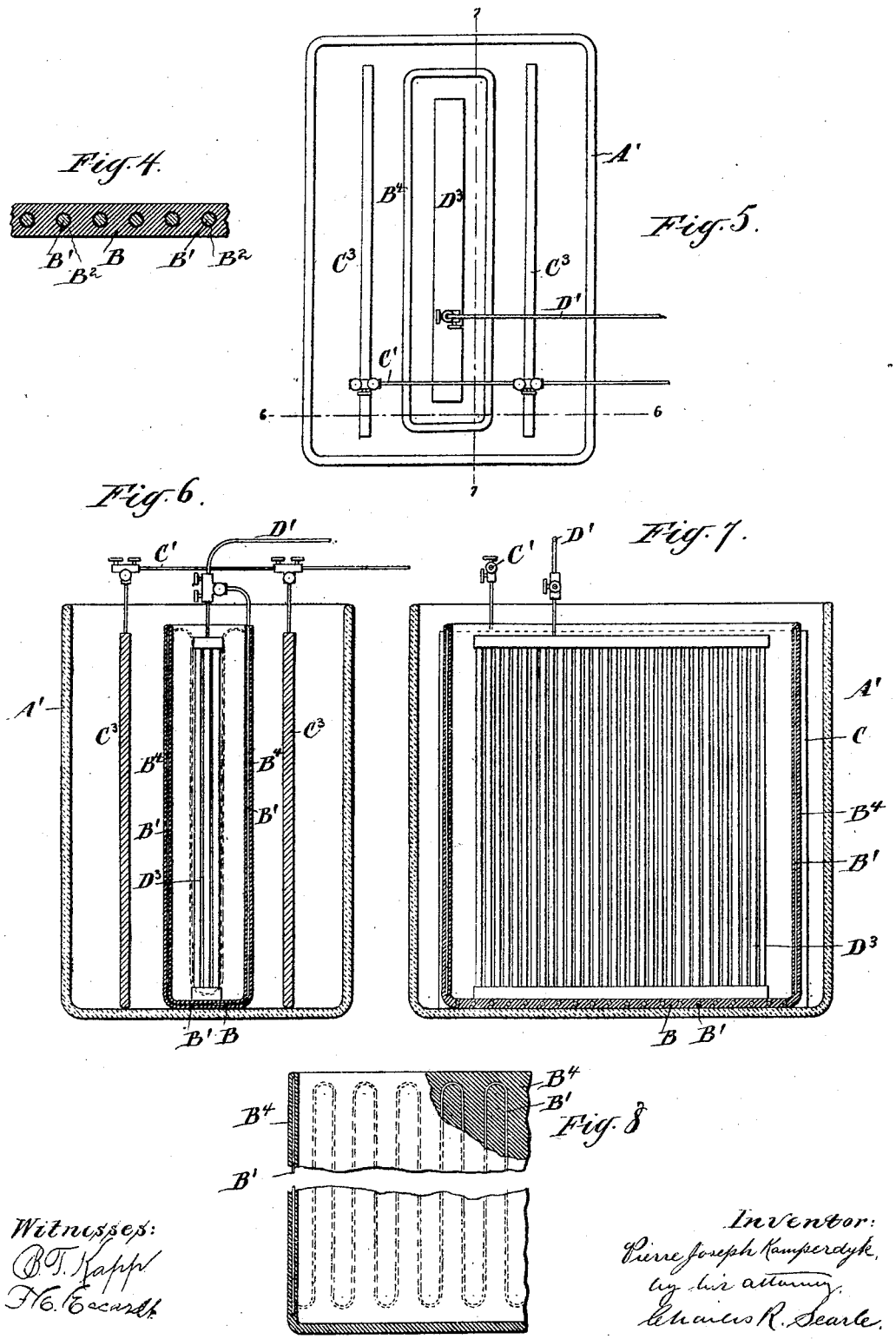

No. 794,864. Patented July 18, 1905.

UNITED STATES PATENT OFFICE.

PIERRE JOSEPH KAMPERDYK, OF NEW YORK, N. Y.

ELECTRIC BATTERY.

SPECIFICATION forming part of Letters Patent No. 794,864, dated July 18, 1905.

Application filed April 2, 1904. Serial No. 201,256.

*To all whom it may concern:*

Be it known that I, PIERRE JOSEPH KAMPERDYK, a subject of the King of Belgium, residing in the city of New York, borough of Manhattan, in the county and State of New York, have invented a certain new and useful Improvement in Electric Batteries, of which the following is a specification.

The invention relates to the construction of a primary cell and to the arrangement and connections of the electrodes therein.

The object of the invention is to provide a porous cup or compartment having a wall adapted to serve as a part of the positive-pole electrode, which wall may be thin to permit the electrodes on opposite faces thereof to be close together and strengthened by means serving to increase the conductivity of the wall, thus correspondingly increasing the efficiency of the cell.

Another object is to so arrange the electrodes relatively to each other and to the other portions of the cell as to produce a maximum of energy with a minimum of space occupied.

Another important object of the invention is to provide a containing vessel of small cost in which the above arrangement may be easily and inexpensively made.

The invention consists in certain novel features and details of construction by which the above objects are attained to be hereinafter described.

The accompanying drawings form a part of this specification and show the invention as it is carried out in practice.

Figure 1 is a plan view of a cell having two negative-pole electrodes arranged in accordance with the invention. Fig. 2 is a corresponding transverse vertical section, partly in elevation, the plane of section being indicated by the line 2 2 in Fig. 1. Fig. 3 is a plan view corresponding to Fig. 1, but showing a cell having one negative-pole electrode. Fig. 4 is a horizontal section on a larger scale through a portion of the wall of the porous cup or compartment. Fig. 5 is a plan view showing a modification. In this form the porous cup is shown as adapted to serve in a common type of primary cell or in electrolytic processes. Fig. 6 is a corresponding vertical section taken on the line 6 6 in Fig. 5, and Fig. 7 is a transverse section on the line 7 7 in the same figure. Fig. 8 is a vertical section, partly in elevation, showing another modification in the construction of the cup.

Similar letters of reference indicate like parts in all the figures.

Referring to Figs. 1 and 2, A indicates a receptacle or exterior vessel of the primary cell made in rectangular form of any suitable material not affected by acids and containing the exciting liquid. The vessel, as illustrated in those figures, is provided with two partitions E E, parallel with each other and the adjacent sides of the vessel and extending its full depth. Each partition is divided in two places, the vertical openings or intervals $e$ thus provided being opposite each other and receiving two plates C C, of zinc, serving as negative-pole electrodes, such openings serving to permit the exciting liquid to circulate and maintain uniform density in all parts of the vessel. On the partitions adjacent to the zinc plates and on each side thereof are grooves $e'$ $e'$, formed on the inner faces, the opposite pairs serving to receive and support carbon plates B B, inserted from above, with their margins engaged in the grooves and in similar grooves $a'$ $a'$ in the bottom of the vessel, the joint being made waterproof by any suitable cement. Thus arranged the space between the partitions is divided into three compartments separated by two intervals, in which are the negative-pole electrodes. The compartments adjacent to the outer walls of the vessel are marked $E'$ $E'$ and the larger central compartment $E^2$. Each serves the function of a porous cup, but with the wall B, presented toward the zinc, alone having the porous quality. The outer compartments contain each a positive-pole electrode D, shown as composed of a plurality of carbon pencils arranged vertically in rows and joined at their upper and lower ends to plates or strips extending the length of the several series, and the central compartment $E^2$ contains two such carbon electrodes. All the compartments are supplied with depolarizing liquid, which may circulate from each to the others through conduits or channels $a$ $a$, cored or otherwise produced in the bottom of the vessel A and having openings $a^2$ $a^2$ in each compartment. Braces $E^3$ $E^3$ are introduced between the central portion of each partition and the adjacent side wall to support such portions, and the vertical openings $e$ $e$ in the partitions are provided with projections $E^4$ $E^4$, serving to maintain the zincs C C out of contact with the walls B B and parallel with the faces thereof, while permitting the exciting liquid to circulate freely. The negative-pole electrodes are joined by a wire C' and the positive-pole electrodes by a wire D', to which is also connected the several carbon plates B B, thus greatly increasing the depolarizing-surface. To permit the positive and negative pole electrodes to be placed close together, the porous carbon plates should be as thin as is consistent with the required strength. I am able to use extremely thin porous walls by reason of the introduction of a series of wires B' in each, which may be placed in the mold in the form of a frame or network or a single wire bent upon itself to serpentine form in long convolutions, as indicated in Fig. 8. The ends of the wires are brought together and project from the upper edge of the plate, where they are joined to the wire D', above referred to. For convenience of illustration the positive-pole electrodes in Figs. 1, 2, and 3 are shown at a greater distance from the porous walls B B than they should be in practice. As above stated, the electrodes should be in close proximity to the plate, so as to lessen the internal resistance of the element. The strengthening-wire must be of a metal not attacked by acids and of high conductivity, as platinum, or, preferably, on the score of economy, of a good conducting metal, as copper, coated with a covering $B^2$ of incorroding conducting metal, as platinum. By employing a single wire carefully plated the danger of exposing the interior metal through uncoated ends of wires or breaks in the covering, liable to occur in constructing a framework of many wires, is largely avoided and the conductor thus insured throughout its length against corrosion and severance.

The cell with two zinc plates above described offers the advantages of high efficiency with small bulk and is the most desirable form for general service, as will be understood. Fig. 3 shows a cell similar in construction, but omitting the central compartment and containing a single negative-pole electrode $C^2$ between two porous carbon plates $B^3$ $B^3$, forming the end compartments $E^5$ $E^5$, connected by channels and having openings thereto at $a^3$ $a^3$. The positive electrodes $D^2$ $D^2$ are connected together and to the porous walls as before.

The containing vessel with its partitions may be molded in wood fiber, papier-mâché, or other suitable material, properly coated interiorly to resist the action of the liquids and be exceedingly strong and light. The simple operation of inserting and cementing the plates B B forms the porous cups or compartments, and the vessel is then ready to receive the electrodes and liquids.

In the modification shown in Figs. 5, 6, and 7 the vessel A' is of simple rectangular form containing the exciting liquid and a centrally-arranged porous cup $B^4$ of carbon strengthened by wires and receiving a positive-pole electrode $D^3$ in the depolarizing liquid. The negative-pole electrodes $C^3$ $C^3$ are zinc plates arranged parallel to the adjacent walls of the cup. In these figures the strengthening and conducting wires B', embedded in the walls of the cup, are shown as extending across the bottom. Fig. 8 shows the wire bent as above described and lying in the side walls alone.

Although I have described the plates B as carbon and prefer such by reason of the additional depolarizing-surface obtained, it will be understood that plates of unglazed earthenware or other porous material may be substituted, and the series of carbon pencils shown as the positive-pole electrodes may be replaced by other forms of carbon or other materials having the required properties.

I claim—

1. In a battery-cell, a vessel, partial partitions therein porous plates or walls supported by said partitions and forming with the latter separated compartments serving as porous cups, positive-pole electrodes received in said compartments, a negative-pole electrode in the interval between each compartment and the next, and means for supporting said negative-pole electrodes in said intervals and permitting the circulation therethrough of the exciting liquid in said vessel.

2. In a battery-cell, a vessel, partial partitions therein porous plates or walls supported by said partitions and forming with the latter separated compartments serving as porous cups, positive-pole electrodes received in said compartments, a negative-pole electrode in the interval between each compartment and the next, means for supporting said negative-pole electrodes in said intervals and permitting the circulation therethrough of the exciting liquid in said vessel, and means for permitting the circulation of a depolarizing liquid in and between the several compartments.

3. In a battery-cell, a vessel, partial partitions therein, porous plates of carbon supported by said partitions and forming with the latter separated compartments serving as porous cups, in combination with positive-pole electrodes received in said compartments and negative-pole electrodes between adjacent compartments, and a connection to said positive-pole electrodes from said plates, whereby the latter serve as part of the positive-pole electrode of the battery.

4. In a two-fluid primary battery, a containing vessel, a porous partition therein separating the exciting and depolarizing liquids and formed of material adapted to serve as part of the positive-pole electrode of said battery, an electrode on one side of said partition, an electrode of opposite polarity on the other side thereof, and a conductor connecting said partition to the electrode of the same polarity as such partition.

5. A porous cup for a primary battery, having its wall formed of carbon and adapted to contain a carbon electrode and a depolarizing agent, a series of wires embedded in said wall and serving to strengthen the latter and increase its conductivity, the said wall serving as part of the positive-pole electrode of the battery.

6. A porous cup for a primary battery, having its wall formed of material adapted to be acted upon by a depolarizing agent, and a series of metallic conductors embedded in said wall and formed by convolutions of a single wire protected against corrosion by a plating of incorrodible conducting metal, and serving to strengthen said wall and increase its conductivity.

In testimony that I claim the invention above set forth I affix my signature in presence of two witnesses.

PIERRE JOSEPH KAMPERDYK.

Witnesses:
D. J. WEST,
CHARLES R. SEARLE.